(12) United States Patent
Sato et al.

(10) Patent No.: US 6,895,216 B2
(45) Date of Patent: May 17, 2005

(54) RENDERING MULTICAST SERVICE WITH SUFFICIENT RECEPTION QUALITY TO WIRELESS TERMINALS

(75) Inventors: Hijin Sato, Yokohama (JP); Narumi Umeda, Yokohama (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 628 days.

(21) Appl. No.: 09/847,414

(22) Filed: May 3, 2001

(65) Prior Publication Data

US 2002/0003798 A1 Jan. 10, 2002

(30) Foreign Application Priority Data

May 12, 2000 (JP) ....................................... 2000-140845

(51) Int. Cl.$^7$ ................................................ H04H 7/00
(52) U.S. Cl. ...................... 455/3.06; 455/502; 455/503; 370/312; 315/347
(58) Field of Search ........................ 455/3.06, 560–563, 455/414.1, 3.01; 370/320, 321, 312, 335; 315/346, 347

(56) References Cited

U.S. PATENT DOCUMENTS

| | | | |
|---|---|---|---|
| 5,577,087 A | | 11/1996 | Furuya |
| 5,887,252 A | | 3/1999 | Noneman |
| 5,930,248 A | | 7/1999 | Langlet et al. |
| 6,434,396 B1 | * | 8/2002 | Rune ........................... 455/502 |
| 6,542,755 B1 | * | 4/2003 | Tsukagoshi .................. 455/503 |
| 6,671,286 B1 | * | 12/2003 | Rinne et al. ................. 370/469 |

FOREIGN PATENT DOCUMENTS

| | | |
|---|---|---|
| EP | 0 845 916 | 6/1998 |
| EP | 0 891 060 | 1/1999 |
| EP | 0 938 210 | 8/1999 |
| EP | 0 951 198 | 10/1999 |
| JP | 05-160776 | 6/1993 |
| JP | 11-331070 | 11/1999 |
| WO | WO 96/27243 | 9/1996 |
| WO | WO 99/55054 | 10/1999 |

OTHER PUBLICATIONS

H. Hamazumi, et al., IEICE Transactions on Communications, vol. E77–B, No. 12, pp. 1461–1467, XP–000498060, "Adaptively Weighted Code Division Multiplexing for Hierarchical Digital Broadcasting", Dec. 1, 1994.

H. Hamazumi, et al., SMPTE Journal, vol. 103, No. 12, pp. 811–816, XP–000479706, "Hierarchical TV Transmission by Spread–Spectrum Multiplexing", Dec. 1, 1994.

M. B. Pursley, et al., IEEE Journal on Selected Areas in Communications, vol. 17, No. 11, pp. 1999–2010, "Multimedia Multicast Wireless Communication with Phase–Shift–Key Modulation and Convolutional Coding", Nov. 1999.

J. Y. Tham, et al., IEEE Journal on Selected Areas in Communications, vol. 16, No. 1, pp. 12–27, "Highly Scalable Wavelet–Based Video Codec for Very Low Bit–Rate Environment", Jan. 1998.

* cited by examiner

*Primary Examiner*—Nay Maung
*Assistant Examiner*—Edan Orgad
(74) *Attorney, Agent, or Firm*—Oblon, Spivak, McClelland, Maier & Neustadt, P.C.

(57) ABSTRACT

The method of invention provides a multicast service from an information delivery apparatus to wireless terminals through wireless routes. The method includes the step of transmitting, from the information delivery apparatus, a plurality of sets of multicast information, wherein these sets are identical to each other as to contents thereof but differ in transmission conditions. The method further includes the step of receiving, at any given one of the wireless terminals, one of the sets of multicast information being transmitted under one of the differing transmission conditions.

16 Claims, 16 Drawing Sheets

PROCESSING GAIN OF SPREADING : LARGE    PROCESSING GAIN OF SPREADING : SMALL

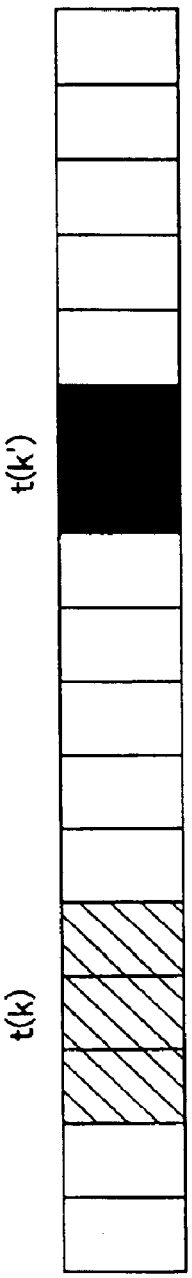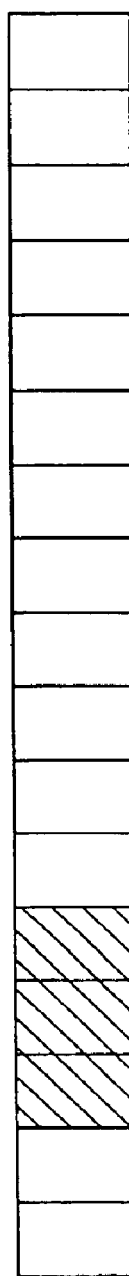
FIG.12A BASE STATION
FIG.12B TERMINAL (GROUP A)
FIG.12C TERMINAL (GROUP B)

RENDERING MULTICAST SERVICE WITH SUFFICIENT RECEPTION QUALITY TO WIRELESS TERMINALS

BACKGROUND OF THE INVENTION

1. Field of the Invention

The present invention generally relates to a method of providing multicast services, and particularly relates to a method of providing multicast services by having an information delivery apparatus deliver multicast information to wireless terminals residing in a service area through wireless routes. The present invention further relates to an information delivery apparatus and a wireless terminal used in such a method of providing multicast services.

2. Description of the Related Art

In recent years, applications that deliver music and video contents through the Internet have been attracting much attention. Use of wireless communication as an access link has an advantage in that information delivery services can be easily provided to users. If music or video contents are delivered as part of such services through a network that includes wireless routes as an access link, resulting merits are enormous.

In a general configuration of multicast service delivery systems that deliver multicast information such as music and video contents through wireless routes, a wireless base station (i.e., information delivery apparatus) transmits multicast information to a plurality of wireless terminals, and these wireless terminals simultaneously receive the multicast information. If the system is configured such that one-to-one communication is carried out between the wireless base station and each of the wireless terminals, the same information having the same contents needs to be delivered through separate channels to individual wireless terminals that are requesting the service. Such a configuration cannot make efficient use of communication resources.

The same multicast information is thus transmitted at once to a plurality of wireless terminals as part of the delivery service. In such a case, each wireless terminal experiences different quality of reception when receiving the multicast information if the wireless terminals are situated in different wireless communication environments. As shown in FIG. 17, for example, wireless terminals H and J that are relatively closer to the wireless base station BS are situated in relatively better communication environments, so that quality of reception is relatively high when receiving multicast information from the wireless base station BS. Since wireless terminals F, G, and I that are situated farther away from the wireless base station BS than the wireless terminals H and J experience relatively poor communication conditions, quality of reception would be poorer. Further, wireless terminals A, B, C, D, and E that are positioned close to a service area Es far away from the wireless base station BS suffer much worse communication environment, so that quality of reception of receiving multicast information from the wireless base station BS would be much poorer.

When multicast services are rendered by using one-to-n wireless communication between the information delivery apparatus and each wireless terminal as described above, each wireless terminal receiving the multicast services may differ in its reception quality. If reception quality varies, there may be a situation in which too many errors are made during reception so as to fail to meet required reception quality.

Accordingly, there is a need for a method of rendering multicast services that can deliver multicast information to wireless terminals experiencing different reception conditions in such a manner as to achieve sufficient reception quality at each of the wireless terminal.

Further, there is a need for an information delivery apparatus that is suitable for such a method of rendering multicast services.

Moreover, there is a need for a wireless terminal that is suitable for the method of rendering multicast services.

SUMMARY OF THE INVENTION

It is a general object of the present invention to provide a scheme of providing multicast services that substantially obviates one or more of the problems caused by the limitations and disadvantages of the related art.

It is another and more specific object of the present invention to provide a method of rendering multicast services that can deliver multicast information to wireless terminals experiencing different reception conditions in such a manner as to achieve sufficient reception quality at each of the wireless terminal.

It is a further object of the present invention to provide an information delivery apparatus an a wireless terminal that are suitable for practicing such a method of rendering multicast services.

In order to achieve the above objects according to the present invention, a method of providing a multicast service from an information delivery apparatus to wireless terminals through wireless routes includes the steps of transmitting, from the information delivery apparatus, a plurality of sets of multicast information, said sets being identical to each other as to contents thereof but differing in transmission conditions, and receiving, at any given one of the wireless terminals, one of the sets of multicast information being transmitted under one of the differing transmission conditions.

In the method of providing multicast services described above, since the information delivery apparatus transmits the plurality of sets of multicast information having the same contents but varying in the transmission conditions thereof, a given wireless terminal residing in the service area of the information delivery apparatus can receive one of the sets of multicast information delivered under such a transmission condition as suitable for the reception quality of the given wireless terminal.

These transmission conditions are defined for the transmission of multicast information to the wireless terminals, and are of such a nature as affecting the reception quality of each wireless terminal.

According to another aspect of the present invention, the method as described above is such that the differing transmission conditions include differing transmission rates at which the multicast information is transmitted.

In the method of providing multicast services described above, a wireless terminal that cannot attain sufficient reception quality at a high transmission rate can choose to receive the multicast information delivered at a low transmission rate.

According to another aspect of the present invention, the method as described above is such that communication between the information delivery apparatus and the wireless terminal is based on code division multiple access, and the differing transmission rates differ in a number of spreading codes used in the transmission of multicast information.

If communication between the information delivery apparatus and the wireless terminal is based on time division multiple access, the differing transmission rates differ in a number of timeslots used in the transmission of multicast information.

Alternatively, the differing transmission rates differ in the number of modulation levels used for modulating the multicast information.

Alternatively, the differing transmission rates differ in a transmission bit rate of the multicast information.

Alternatively, if communication between the information delivery apparatus and the wireless terminal is based on code division multiple access, the differing transmission conditions include differing processing gains of spreading the multicast information.

In order to avoid co-channel interference, the method as described above is such that the differing transmission conditions include differing positions of timeslots used in the transmission of multicast information.

In the method of providing multicast services described above, the level of the co-channel interference differs depending on the positions of timeslots, so that a given wireless terminal can receive the multicast information by using proper timeslots that are selected in response to the reception quality of the terminal to provide the lowest co-channel interference.

In order that the information delivery apparatus can deliver the multicast information by using transmission conditions suitable to each wireless terminal's reception quality, the method as described above further includes the steps of measuring reception quality at each of the wireless terminals, and notifying the information delivery apparatus of measured results of the reception quality, and determining, at the information delivery apparatus, the differing transmission conditions based on the measured results of the reception quality, the differing transmission conditions being used to transmit the plurality of sets of multicast information.

In order that each wireless terminal can easily receive the multicast information delivered by using transmission conditions suitable for each wireless terminal's reception conditions, the method as described above further includes a step of having the information delivery apparatus notify the wireless terminals of the differing transmission conditions, wherein said step of receiving receives the one of the sets of multicast information by using the one of the differing transmission conditions that is notified by the information delivery apparatus.

In order that each wireless terminal can actively select and receive the multicast information at the better reception quality, the method as described above further includes the steps of reporting, from the information delivery apparatus to the wireless terminals, the differing transmission conditions used to transmit the plurality of sets of multicast information, and measuring reception quality at each of the wireless terminals, and selecting a transmission condition from the reported differing transmission conditions based on the measured reception quality, the selected transmission condition being used for receiving one of the sets of multicast information.

In order to achieve a substantially equal delivery time for each transmission rate when delivering the same multicast information at different transmission rates, the method as described above further includes a step of decreasing a size of the multicast information to be transmitted as the differing transmission rates decrease.

According to another aspect of the present invention, the method as described above is such that said step of decreasing adjusts a compression rate of the multicast information to be transmitted so as to decrease the size of the multicast information.

In order to deliver the multicast information at different transmission rates by reading it from a single buffer, the method as described above further includes the steps of storing the multicast information in a buffer at the information delivery apparatus as the multicast information is received from a network, and assigning channels to the respective sets of the multicast information as the respective sets are read from the buffer at rates of reading corresponding to the differing transmission rates.

In order to eliminate difficulties caused by delays of information delivery as these delays are generated by differences in transmission rates when delivering the multicast information at different transmission rates from a single buffer, the method as described above further includes a step of adjusting the differing transmission rates based on delays of the reading of the multicast information from the buffer.

Further, according to the present invention, an information delivery apparatus for delivering multicast information to wireless terminals through wireless routes includes a multicast information storage unit which stores the multicast information to be transmitted, and an information delivery control unit which transmits a plurality of sets of the multicast information, which are identical to each other as to contents thereof but differ in transmission conditions.

Moreover, a wireless terminal for receiving multicast information from an information delivery apparatus through wireless routes includes a control unit which measures reception quality of signals received from the information delivery apparatus, and receives one of sets of the multicast information sent from the information delivery apparatus by using transmission conditions selected based on the measured reception quality, wherein the sets of multicast information are identical to each other but differ in transmission conditions.

Other objects and further features of the present invention will be apparent from the following detailed description when read in conjunction with the accompanying drawings.

BRIEF DESCRIPTION OF THE DRAWINGS

FIGS. 12A through 12C are illustrative drawings showing delivery of multicast information by using varying timeslot positions;

DESCRIPTION OF THE PREFERRED EMBODIMENTS

In the following, embodiments of the present invention will be described with reference to the accompanying drawings.

Figure 1:
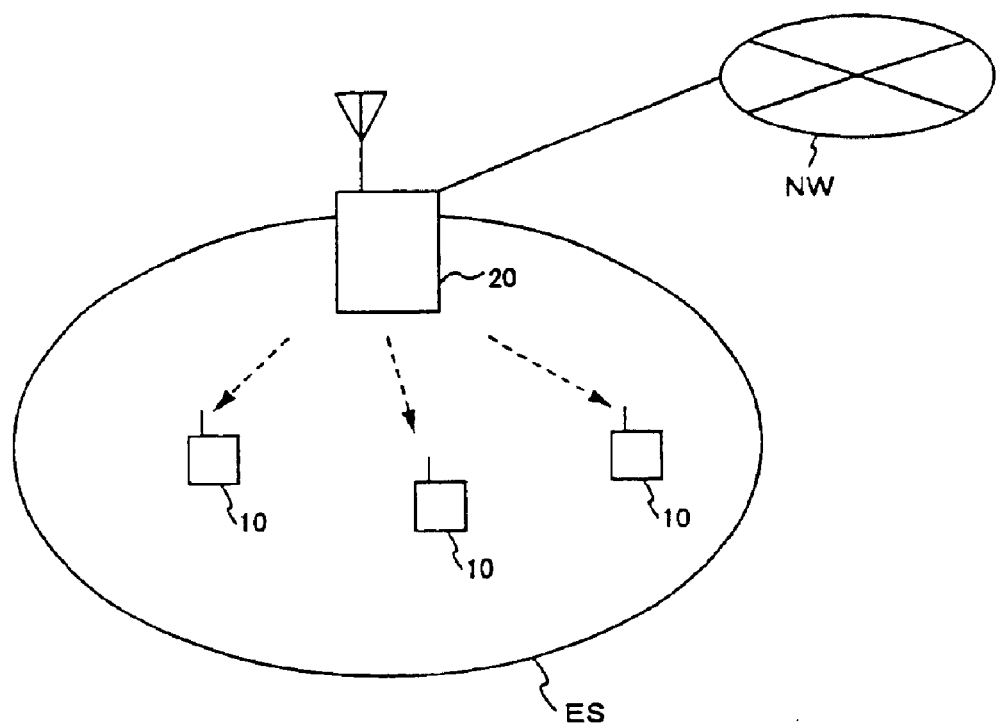
FIG. 1 is an illustrative drawing showing an example of a system for providing multicast services according to an embodiment of the present invention.

FIG. 1 is an illustrative drawing showing an example of a system for providing multicast services according to an embodiment of the present invention.

In FIG. 1, a wireless base station 20 serving as an information delivery apparatus covers a service area Es. The wireless base station 20 obtains information to be delivered through a network NW (e.g., an IP network), and attends to delivery service to deliver the obtained multicast information to each wireless terminal 10 residing in the service area Es.

Figure 2:
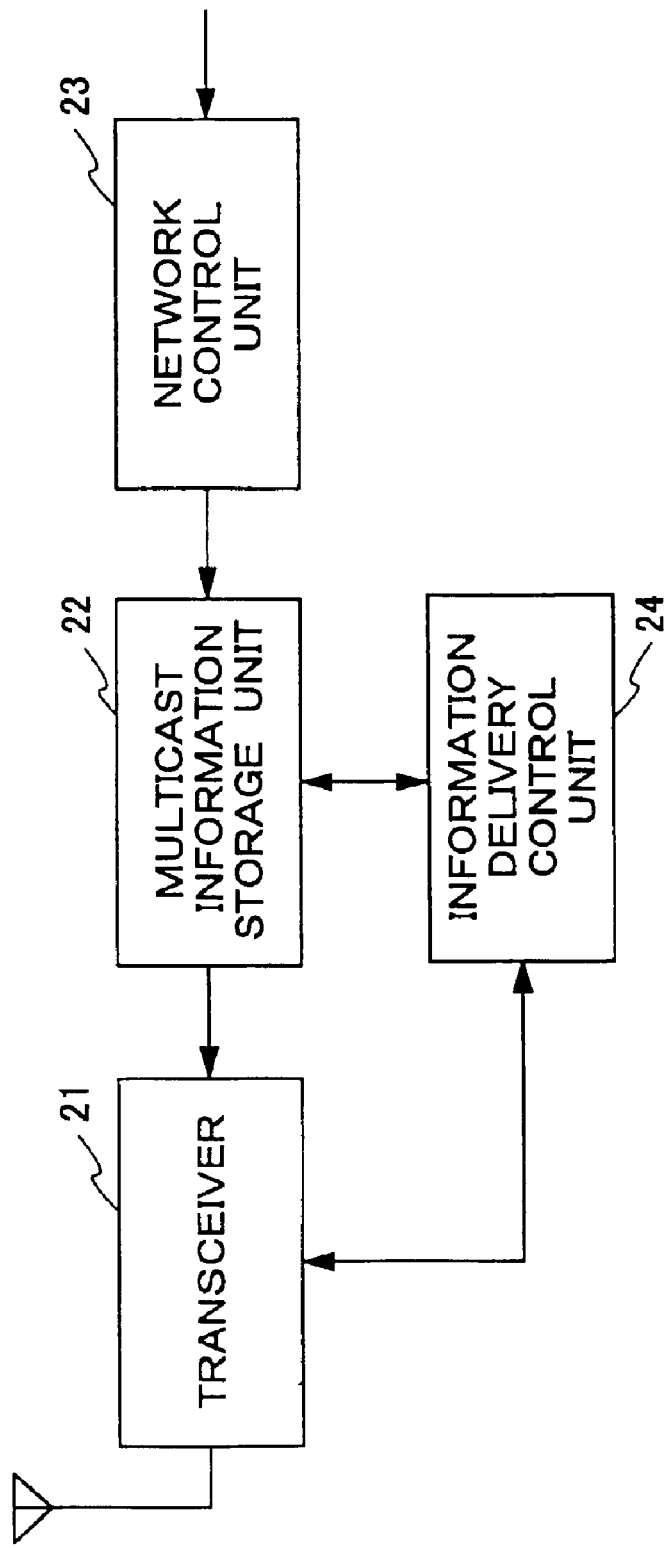
FIG. 2 is a block diagram of an example of a wireless base station.

FIG. 2 is a block diagram of an example of the wireless base station 20.

In FIG. 2, the wireless base station 20 includes a transceiver 21, a multicast information storage unit 22, a network control unit 23, and an information delivery control unit 24. The transceiver 21 carries out wireless communication with each wireless terminal 10 residing in the service area Es. The network control unit 23 serves as a source of information, and communicates with a server through a predetermined network (e.g., an IP network), for example, to obtain multicast information to be delivered. The multicast information storage unit 22 stores the multicast information that the network control unit 23 received through the predetermined network. This corresponds to a buffering operation. The information delivery control unit 24 attends to control for delivering the multicast information from the transceiver 21 to each wireless terminal 10 situated in the service area Es as the multicast information is successively stored in the multicast information storage unit 22.

Figure 3:
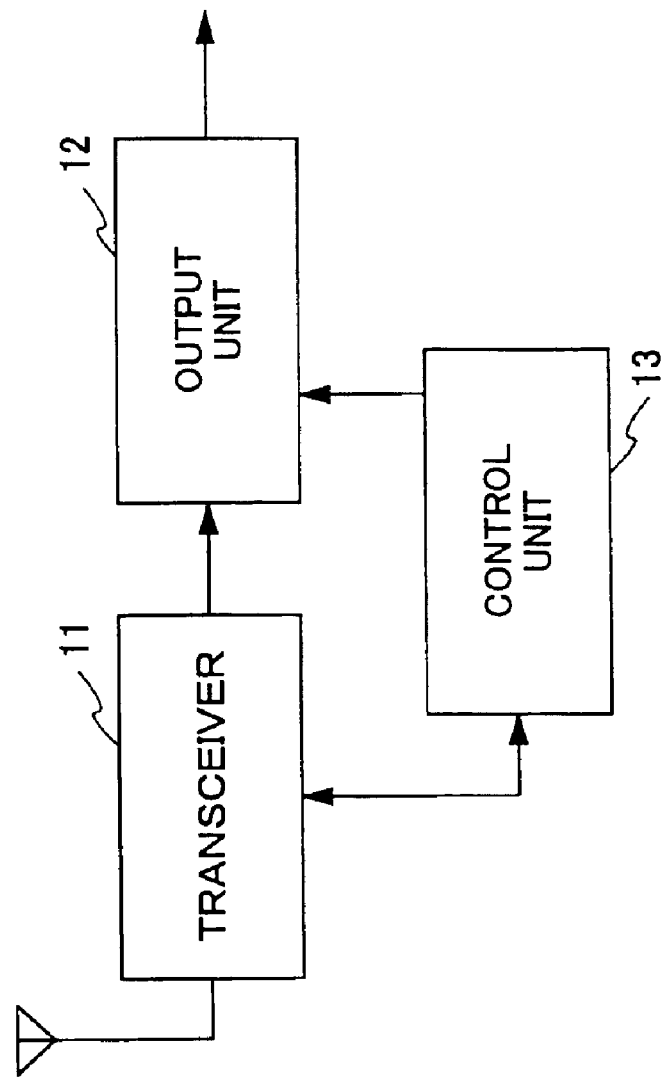
FIG. 3 is a block diagram showing an example of a wireless terminal.

FIG. 3 is a block diagram showing an example of each wireless terminal 10.

In FIG. 3, the wireless terminal 10 includes a transceiver 11, an output unit 12, and a control unit 13. The transceiver 11 exchanges information with the transceiver 21 of the wireless base station 20. The output unit 12 outputs the multicast information (e.g., music or video) in a proper format corresponding to the type of the information (e.g., audio format or video format) as the transceiver 11 receives the multicast information from the wireless base station 20. The control unit 13 controls the transceiver 11 and the output unit 12, and measures reception quality of downlink signals received by the transceiver 11. Such reception quality may include a reception level, an interference level, a noise level, an error rate, etc.

In the system for rendering multicast services as described above, each wireless terminal 10 residing in the service area Es of the wireless base station 20 uses the control unit 13 to measure reception quality such as a reception level with regard to a free downlink channel that is used by the transceiver 11 for signal reception. Each wireless terminal 10 notifies the wireless base station 20 of the results of measurement. Notification of the measured results of reception quality may be made by attaching the measured results to a request signal that is transmitted to the wireless base station 20 for the purpose of requesting delivery service of a desired multicast group (variety of music or video, multicast information). If each wireless terminal 10 carries out communication of unicast information other than the reception of multicast information with the wireless base station 20 (i.e., if unicast is additionally performed), the notification of measured results of reception quality may be made by using a control channel associated with the channel for the communication of unicast information.

In response to the request signal requesting a multicast group, the wireless base station 20 transmits to the wireless terminal 10 the transmission conditions of multicast information corresponding to the requested multicast group. The transmission conditions of multicast information specifies requirements for the transmission of multicast information to the wireless terminal 10, and may indicate a wireless channel, a transmission rate, the number of modulation levels, a transmission timeslot, a processing gain PG of spreading, spreading codes, and the number of the spreading codes, etc. Information about such conditions is necessary for each wireless terminal 10 to receive multicast information from the wireless base station 20. These conditions may affect reception quality when each wireless terminal 10 receives multicast information. The wireless base station 20 may be able to transmit the transmission conditions of multicast information when transmitting to each wireless terminal 10 a signal responding to the request signal received from each wireless terminal 10.

The information delivery control unit 24 of the wireless base station 20 takes into account the rate of multicast information received from the network and at leas some of the measured results of reception quality received from the wireless terminal 10 that requested the multicast information. Based on this, the information delivery control unit 24 determines how to deliver the requested multicast information.

In the case of a system based on code division multiple access (CDMA), a change may be made to the processing gain PG of spreading, thereby changing the transmission band after spreading. In general, the processing gain PG is raised to improve transmission quality.

Figure 4:
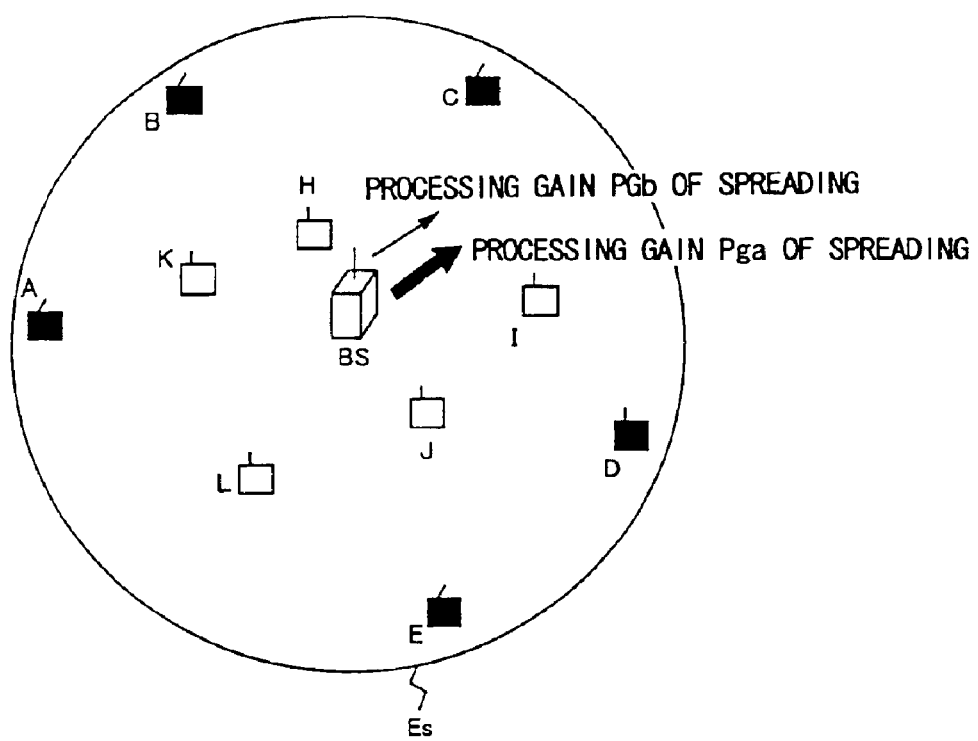
FIG. 4 is an illustrative drawing for showing the way the multicast information is transmitted through separate transmission channels to wireless terminals situated different communication environments by controlling a processing gain in response to a required transmission rate.

FIG. 4 is an illustrative drawing for showing the way the multicast information is transmitted in a multiplexed manner through separate transmission channels to wireless terminals situated different communication environments by controlling the processing gain PG in response to a required transmission rate.

Figure 5:
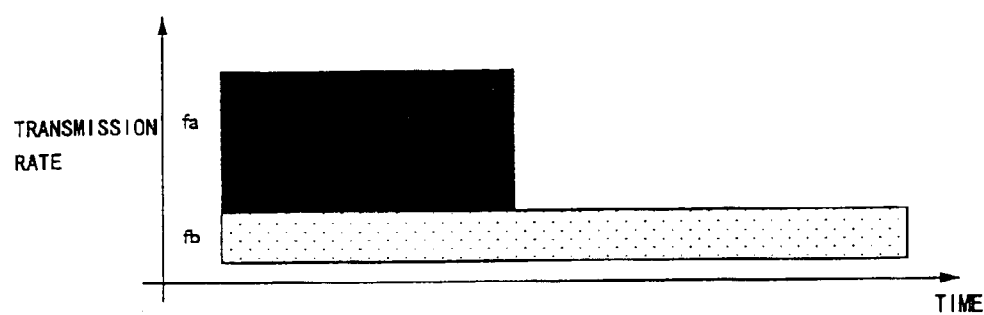
FIG. 5 is a chart showing differences in transmission time between a low rate transmission and a high rate transmission.

The rate of given multicast information is I, and the bandwidth after spreading is B. Since wireless terminals A through E in FIG. 4 reside in poor communication environments because of weak reception signals or the like, required reception quality is not satisfied unless a low rate transmission (fb) is employed. Wireless terminals H through L shown in FIG. 4, on the other hand, reside in advantageous communication environments, so that a high speed transmission (fa) satisfies the required reception quality. In such a case, transmission of the same multicast information at the low rate and at the high rate results in a shorter transmission time for the high speed transmission and a longer transmission time for the low speed transmission as shown in FIG. 5.

Figure 6:
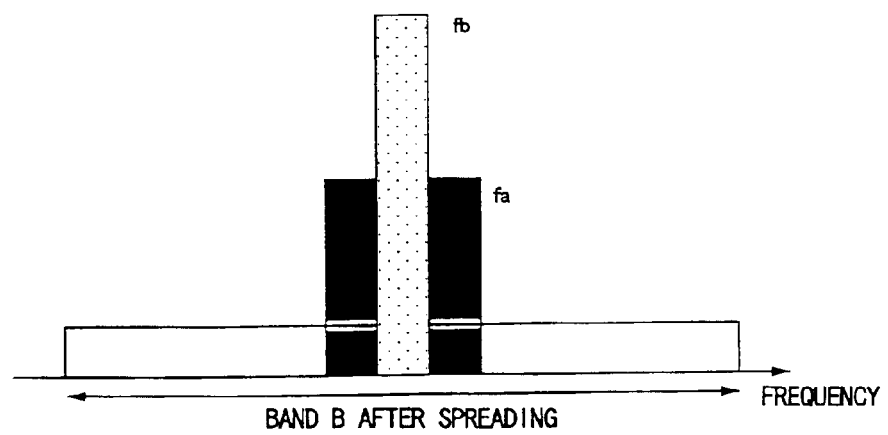
FIG. 6 is a chart showing relationships in the frequency domain between a bandwidth after spreading, a bandwidth of high rate transmission, and a bandwidth of low rate transmission.

FIG. 6 is a chart showing relationships in the frequency domain between the bandwidth after spreading, the bandwidth of high rate transmission (fa) before spreading, and the bandwidth of low rate transmission (fb) before spreading. As shown in FIG. 6, the bandwidth of high rate transmission (fa) before spreading has a broader information band than the bandwidth of low rate transmission before spreading.

Under the conditions that the bandwidth after spreading is B, information spreads over the bandwidth B during transmission no matter the information is high rate information or low rate information. A processing gain of spreading of the high rate information (fa) is denoted as PGa, and a processing gain of spreading of the low rate information (fb) is denoted as PGb. Then, the rate of information, the processing gain, and the bandwidth B after spreading are related as:

High Rate Transmission: fa×PGa=B
Low Rate Transmission: fb×PGb=B

Figure 7:
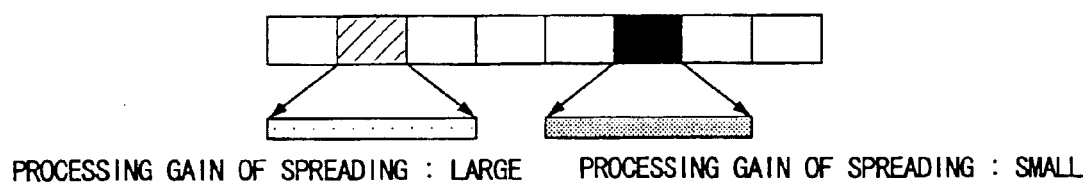
FIG. 7 is an illustrative drawing showing different time slots that carry multicast information having different processing gains of spreading.

In this example, the processing gain of spreading is determined in response to a transmission rate based on the above relationships. Since each wireless terminal has different reception quality because of different communication environment, the same multicast information is transmitted by using different processing gains as shown in FIG. 7. This makes it possible to receive multicast information in a short time period if the wireless terminal is capable of receiving information at high rate. If the wireless terminal receives the service in a disadvantaged communication environment such as an area of weak radio reception, the processing gain is raised to improve the transmission quality of multicast information and a low rate reception is arranged. This results in a longer reception time, but the service can be properly received.

The above description has been provided with reference to a case in which there are two reception qualities for wireless terminals that receive the same multicast service. It should be noted that there may be a larger number of reception qualities, and that multicast information can be transmitted in a multiplexed manner by using more than two information rates and processing gains.

A wireless base station BS (which refers to the wireless base station 20 hereinafter) sends the processing gain of spreading as determined above to a wireless terminal requesting a multicast service as part of notification of the transmission conditions of multicast information. The wireless terminal receives the multicast information from the wireless base station BS by using the processing gain of spreading as notified.

Parameters that control the transmission rate of multicast information delivered to a wireless terminal requesting the multicast information may be determined as part of the transmission conditions of multicast information based on the measured reception quality reported by the wireless terminal.

In a system based on the CDMA scheme, the number of spreading codes is generally controlled to change the transmission rate. When a multiple access scheme based on use of a plurality of time slots is employed, the number of spreading codes may be changed between different time slots. This makes it possible to deliver the same multicast information at different transmission rates.

Figure 8:
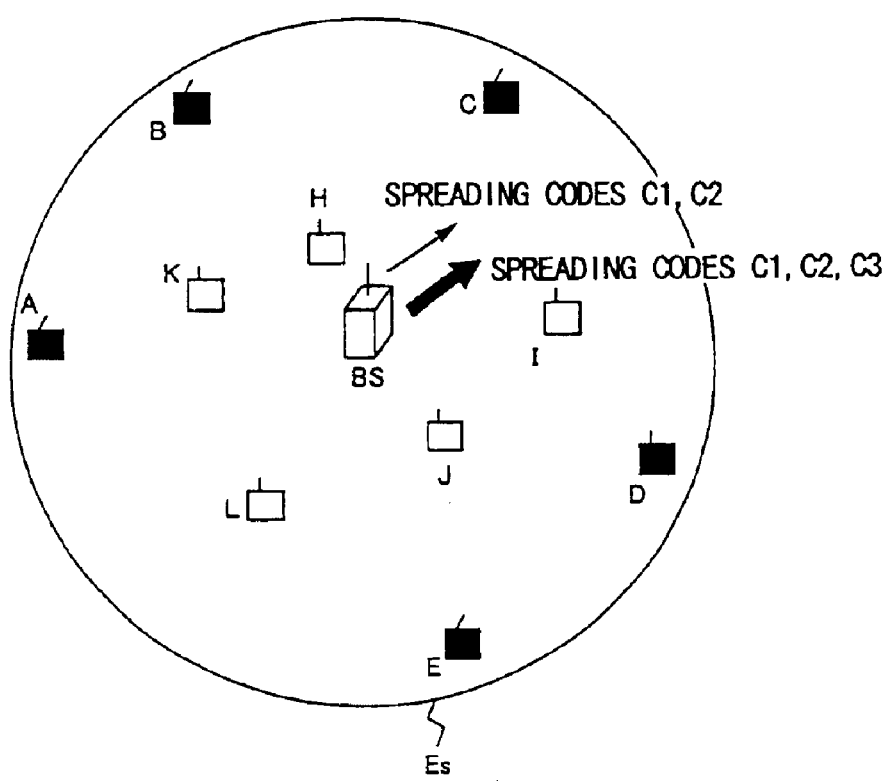
FIG. 8 is an illustrative drawing showing the way the same multicast information is delivered by changing the number of spreading codes.

FIG. 8 is an illustrative drawing showing the way the same multicast information is delivered by changing the number of spreading codes. Here, the rate of multicast information as received from the network NW is denoted as I, and it is assumed that this multicast information can be delivered at a transmission rate corresponding to the rate of information I by using a timeslot and three spreading codes. In the example of FIG. 8, wireless terminals H through L positioned relatively closer to the wireless base station BS have relatively better reception quality, so that the multicast information can be transmitted at a relatively high rate (i.e., corresponding to the rate of information I) to the wireless terminals H through L by using the three spreading codes C1, C2, and C3. This still maintains the service quality (i.e., reception quality) for the wireless terminals H through L above a predetermined level. Accordingly, use of the three spreading codes C1, C2, and C3 is chosen as the transmission conditions of multicast information for the wireless terminals H through L based on the reception quality thereof.

Since reception quality at the wireless terminals A through E farther away from the wireless base station BS is poorer, use of the three spreading codes for delivering multicast information to the wireless terminals A through E cannot achieve a service quality (reception quality) above the predetermined required level. In such a case, only two spreading codes may be used for the wireless terminals A through E that suffer a poor reception quality, thereby delivering the multicast information at a lower rate. This can maintain the service quality at the wireless terminals A through E above the predetermined level. Accordingly, use of two spreading codes C1 and C2 is chosen as the transmission conditions of multicast information for the wireless terminals A through E based on the reception quality thereof.

Figure 9:
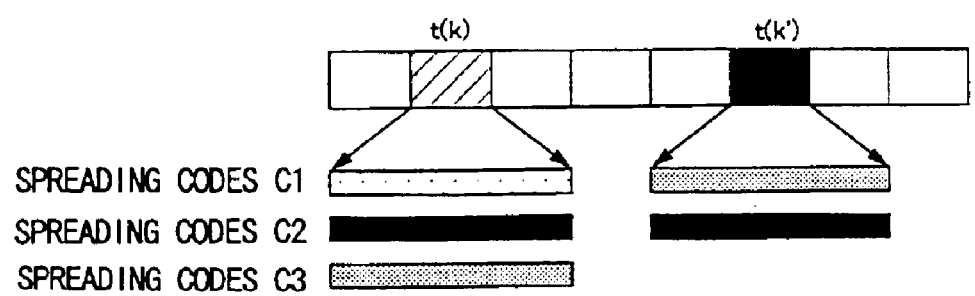
FIG. 9 is an illustrative drawing showing different timeslots that carry multicast information spread by different spreading codes.

In this case, the wireless base station BS multiplexes and transmits the multicast information spread by the three spreading codes C1, C2, and C3 and the multicast information spread by the two spreading codes C1 and C2 by including them in respective timeslots t(k) and t(k') as shown in FIG. 9. The wireless base station BS notifies the wireless terminals H through L of the timeslot t(k) and the three spreading codes C1, C2, and C3 as the transmission conditions of multicast information, and notifies the wireless terminals A through E of the timeslot t(k') and the two spreading codes C1 and C2 as the transmission conditions of multicast information.

As a result, the wireless terminals H through L receive the downlink timeslot t(k) from the wireless base station BS, and decode the received signal based on the three spreading codes C1, C2, and C3. The wireless terminals A through E receive the downlink timeslot t(k') from the wireless base station BS, and decode the received signal based on the two spreading codes C1 and C2. This insures that all the wireless terminals A through L receive the same delivery service of multicast information while maintaining the service quality above the predetermined level.

Figure 10:
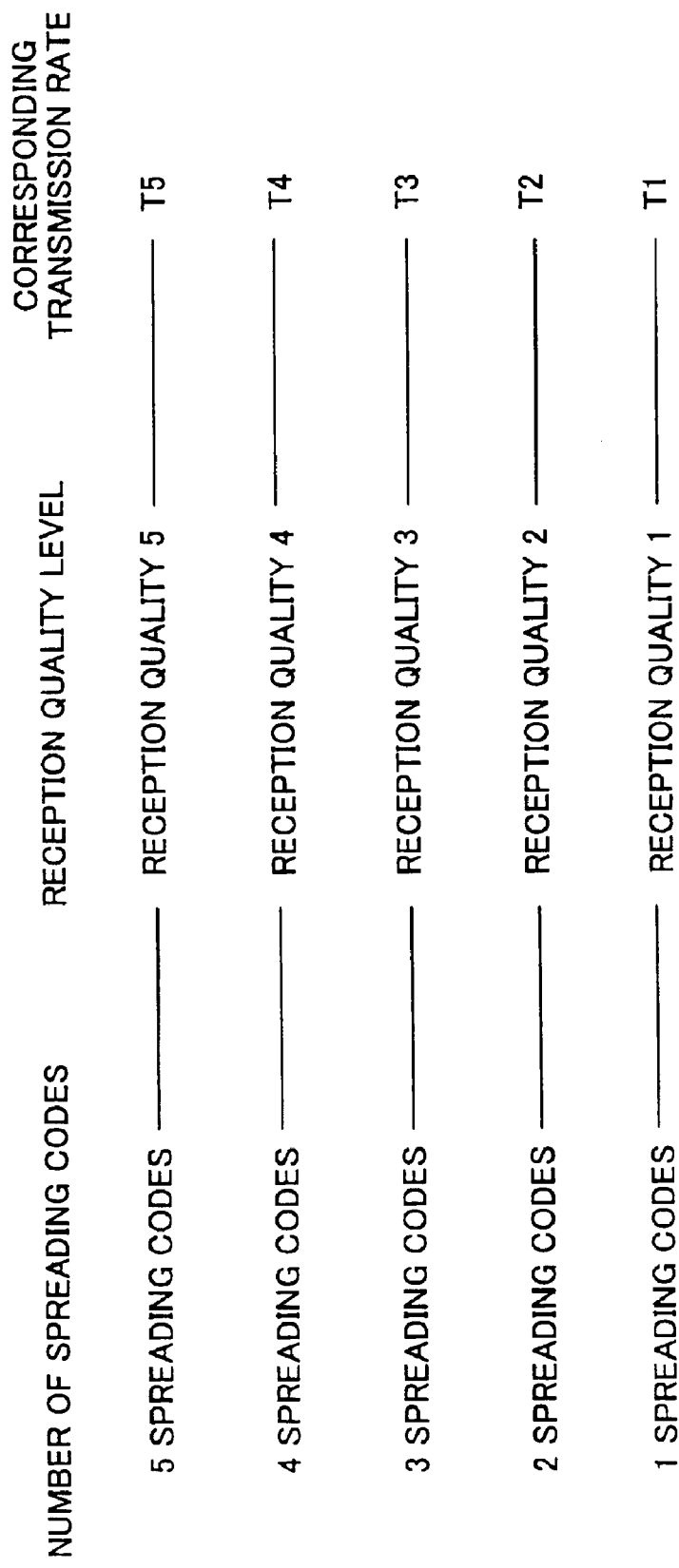
FIG. 10 is a table showing reception qualities and corresponding transmission rates.

In the above example, the number of spreading codes is chosen based on the reception quality at each wireless terminal so as to correspond to one of the two different transmission rates. It should be noted that the number of spreading codes may be chosen so as to select a transmission rate from more than two different transmission rates. In such a case, the information delivery control unit 24 of the wireless base station BS may be provided with a table that lists reception qualities and the corresponding numbers of spreading codes as shown in FIG. 10. In FIG. 10, reception quality level 5 (the highest quality) affords use of five spreading codes and transmission at transmission rate T5 (the fastest rate). At reception quality level 4, four spreading codes are used, and transmission is possible at transmission rate T4 (<T5). At reception quality level 3, three spreading codes are used, and transmission is possible at transmission rate T3 (<T4). Further, reception quality level 2 permits use of two spreading codes and transmission at transmission rate T2 (<T3). Finally, reception quality level 1 (the lowest quality) allows only one spreading code to be used for transmission at transmission rate T1 (<T2). The information delivery control unit 24 refers to the table as described above so as to choose the number of spreading codes that corresponds to reception quality reported from a wireless terminal.

The transmission rates listed in the table are related as:

$$T2 = 2 \times T1$$

$$T3 = 3 \times T1$$

$$T4 = 4 \times T1$$

$$T5 = 5 \times T1$$

In a system based on the time division multiple access, the number of timeslots is generally controlled to change the transmission rate, and the positions of timeslots are changed to avoid co-channel interference. In this example, the same multicast information is copied and transmitted at once in the TDMA system that chooses the number of timeslots in response to the rate of multicast information.

Figure 11:
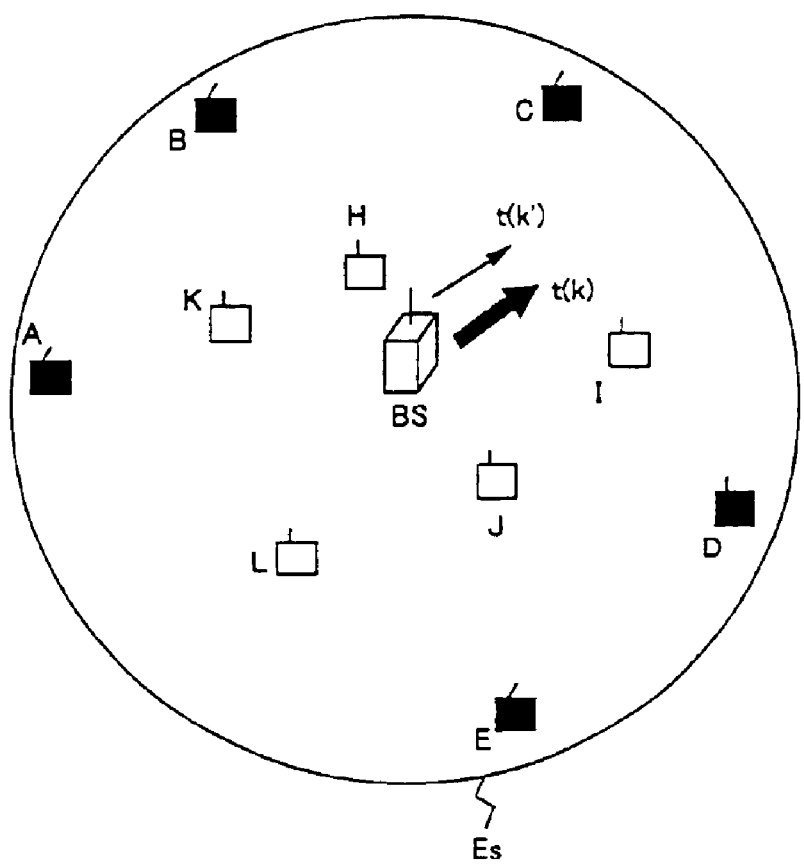
FIG. 11 is an illustrative drawing showing the way the same multicast information is transmitted by changing the position of timeslots.

FIG. 11 is an illustrative drawing showing the way the same multicast information is transmitted by changing the position of timeslots. The rate of multicast information is denoted as I, and it is assumed that the information of the rate I can be transmitted by using three timeslots. Wireless terminals H through L shown in FIG. 11 are supposed to satisfy required service quality when transmission is carried out as assumed above. Namely, the wireless base station BS transmits multicast information by using a timeslot group t(k) comprised of three timeslots as shown in FIG. 12A, and each of the wireless terminals H through L can satisfy the required service quality when receiving these timeslots.

Wireless terminals A through E shown in FIG. 11 cannot properly receive the information conveyed by the timeslot group t(k) because of co-channel interference, so that these terminals cannot satisfy the required service quality if transmission is carried out as assumed. In such a case, the wireless base station BS uses a timeslot group t(k') for the wireless terminals A through E concurrently with the transmission of multicast information to other terminals by use of the timeslot group t(k). In this manner, all the wireless terminals A through L can receive the same multicast services with satisfactory service quality.

In this example, the timeslot group t(k') has two available timeslots. As the number of timeslots decreases from three to two, the transmission rate also decreases.

Further, the modulation scheme (the modulation multi-number) can be changed to control the transmission rate irrespective of what multiple access scheme is employed. Based on this, delivering the same multicast information that is modulated by different modulation schemes (different modulation multi-numbers) in different timeslots makes it possible to achieve different transmission rates of the same multicast information.

Figure 13:
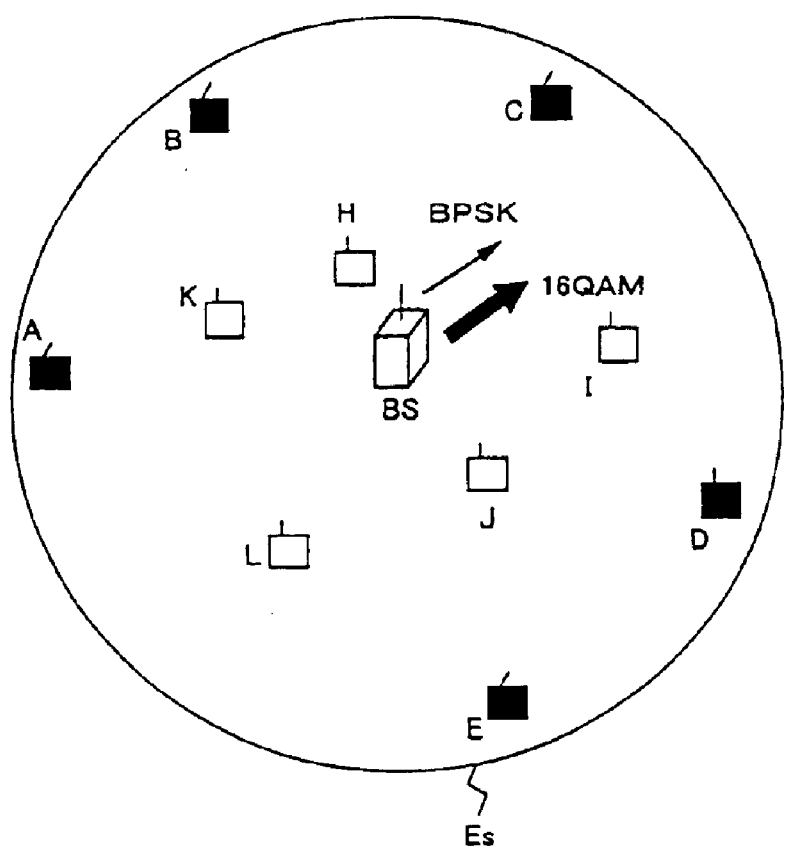
FIG. 13 is an illustrative drawing showing the way the same multicast information is transmitted by changing the number of modulation levels.

FIG. 13 is an illustrative drawing showing the way the same multicast information is transmitted by changing the modulation multi-number. The rate of multicast information as received from the network NW is denoted as I, and it is assumed that this multicast information can be delivered at a transmission rate corresponding to the rate of information I by modulating the multicast information based on the 16 QAM modulation scheme. In the example of FIG. 13, wireless terminals H through L positioned relatively closer to the wireless base station BS have relatively better reception quality, so that the multicast information can be transmitted at a relatively high rate (i.e., corresponding to the rate of information I) to the wireless terminals H through L by using the 16 QAM modulation scheme. This still maintains the service quality (i.e., reception quality) for the wireless terminals H through L above a predetermined level. Accordingly, use of the 16 QAM modulation scheme is chosen as the transmission conditions of multicast information for the wireless terminals H through L based on the reception quality thereof.

Since reception quality at the wireless terminals A through E farther away from the wireless base station BS is poorer, use of the 16 QAM modulation scheme for modulating and transmitting multicast information to the wireless terminals A through E cannot achieve a service quality (reception quality) above the predetermined required level. In such a case, the BPSK modulation scheme may be used for the wireless terminals A through E that suffer a poor reception quality, thereby delivering the multicast information at a lower rate. This can maintain the service quality at the wireless terminals A through E above the predetermined level. Accordingly, use of the BPSK modulation scheme is chosen as the transmission conditions of multicast information for the wireless terminals A through E based on the reception quality thereof.

Figure 14:
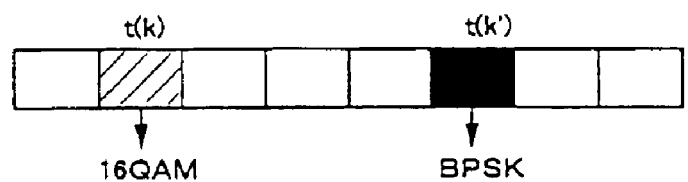
FIG. 14 is an illustrative drawing showing different time slots that carry multicast information modulated by different modulation schemes.

In this case, the wireless base station BS transmits the multicast information modulated according to 16 QAM modulation scheme and the multicast information modulated according to the BPSK modulation scheme by including them in respective timeslots t(k) and t(k') as shown in FIG. 14. The wireless base station BS notifies the wireless terminals H through L of the timeslot t(k) and the 16 QAM modulation scheme as the transmission conditions of multicast information, and notifies the wireless terminals A through E of the timeslot t(k') and the BPSK modulation scheme as the transmission conditions of multicast information.

As a result, the wireless terminals H through L receive the downlink timeslot t(k) from the wireless base station BS, and decode the received signal based on the demodulation scheme corresponding to the 16 QAM modulation scheme. The wireless terminals A through E receive the downlink timeslot t(k') from the wireless base station BS, and decode the received signal based on the demodulation scheme corresponding to the BPSK modulation scheme. This insures that all the wireless terminals A through L receive the same delivery service of multicast information while maintaining the service quality above the predetermined level.

Figure 15:
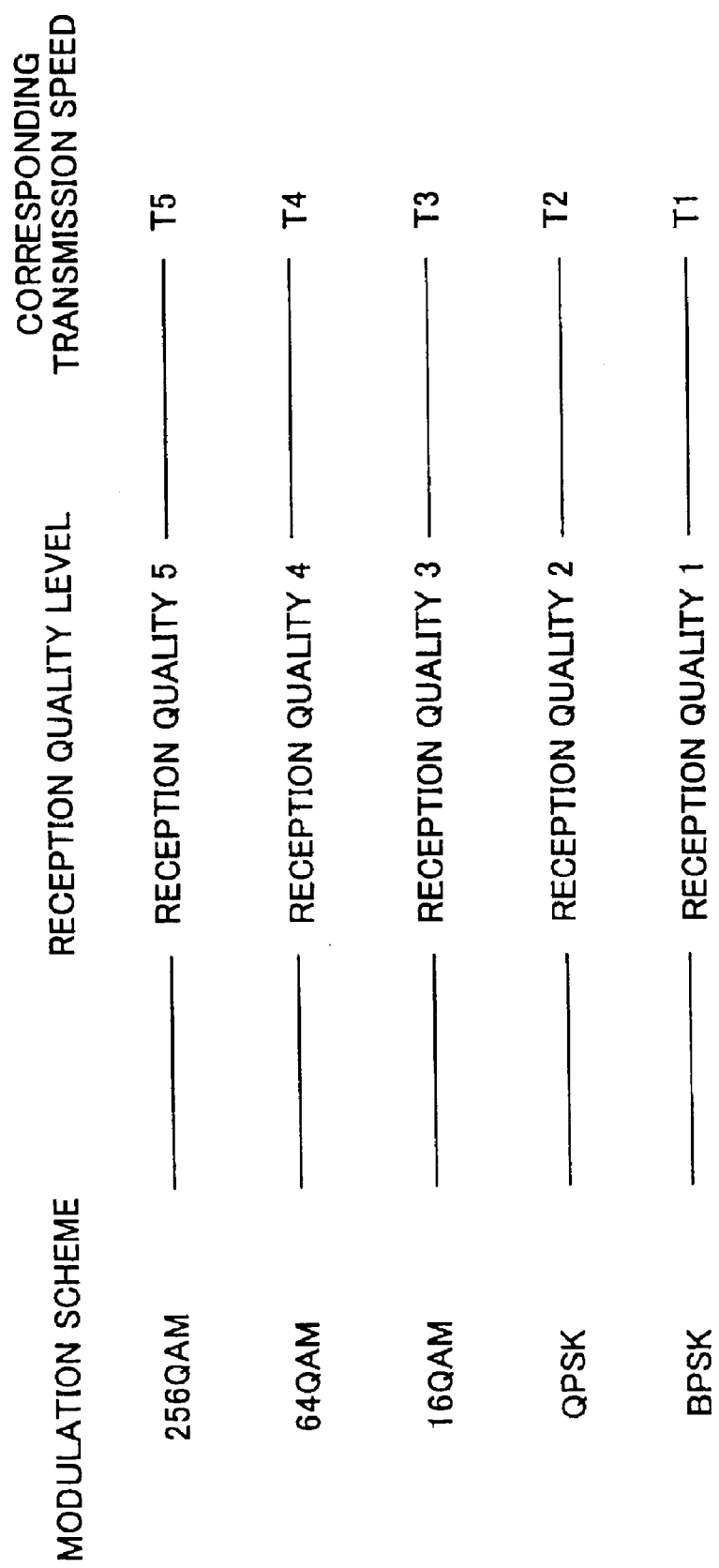
FIG. 15 is a table showing reception qualities and corresponding transmission rates.

In the above example, a modulation scheme (modulation multi-number) is chosen based on the reception quality at each wireless terminal so as to correspond to one of the two different transmission rates. It should be noted that a modulation scheme may be chosen so as to select a transmission rate from more than two different transmission rates. In such a case, the information delivery control unit 24 of the wireless base station BS may be provided with a table that lists reception qualities and the corresponding modulation schemes (modulation multi-numbers) as shown in FIG. 15. In FIG. 15, reception quality level 5 (the highest quality) affords use of the 256 QAM modulation scheme having the largest modulation multi-number and transmission at transmission rate T5 (the fastest rate). At reception quality level 4, the 64 QAM modulation scheme is used, and transmission is possible at transmission rate T4 (<T5). At reception quality level 3, the 16 QAM modulation scheme is used, and transmission is possible at transmission rate T3 (<T4). Further, reception quality level 2 permits use of the QPSK modulation scheme and transmission at transmission rate T2 (<T3). Finally, reception quality level 1 allows the BPSK modulation scheme to be used for transmission at transmission rate T1 (<T2). The information delivery control unit 24 refers to the table as described above so as to choose a modulation scheme (modulation multi-number) that corresponds to reception quality reported from a wireless terminal.

The transmission rates listed in the table are related as:

$T2=2\times T1$ $T3=2\times T2$ $T4=2\times T3$ $T5=2\times T4$

In the above example, the modulation scheme (modulation multi-number) is changed so as to conform to the reception quality at each wireless terminal. Alternatively, the bit rate of multicast information may be controlled.

The wireless base station BS receives multicast information at the information rate I from the network NW, and stores the multicast information successively in the multicast information storage unit (buffer) 22. Then, the wireless base station BS successively transmits the multicast information stored in the multicast information storage unit 22 by using different transmission conditions (e.g., using different transmission rates or the like) as described above. When the same multicast information is transmitted to a plurality of wireless terminals at different transmission rates, an attempt to arrange the same delivery time will fail since the multicast information transmitted at a low transmission rate cannot be timely finished. When the same delivery time is desired, therefore, it is desirable to compress the multicast information directed to each wireless terminal in accordance with the transmission rate thereof. This insures the timely completion of multicast information delivered at a low transmission rate.

As previously described, the information delivery control unit 24 chooses the transmission rate of multicast information (i.e., the number of spreading codes, the number of timeslots, the modulation multi-number, the bit rate, etc.) based on the reception quality of each wireless terminal. When this is done, the information delivery control unit 24 compresses the multicast information in accordance with the selected transmission rate. A description will be given in the following with regard to the compression rate CR and how it is chosen based on the information rate I of multicast information as received from the network NW and the transmission rate T determined as a proper transmission rate.

When the information rate I of multicast information is no larger than the transmission rate T (I≦T: i.e., high speed transmission), the compression rate R is set equal to "1". Namely, no compression of multicast information is performed. When the information rate I of multicast information is larger than the transmission rate T (I>T: i.e., low speed transmission), the compression rate R is set as:

$CR=1-(I-T)/I.$

The information delivery control unit 24 carries out a predetermined algorithm to compress multicast information stored in the multicast information storage unit 22 so as to achieve the selected compression rate CR. The multicast information compressed in this manner is then delivered from the transceiver 21 to the wireless terminals.

In this case, the wireless base station BS notifies the wireless terminals of the compression rate CR as one of the transmission conditions of multicast information. In a given wireless terminal that receives the multicast information at a given transmission rate, the control unit 13 decompresses the received multicast information by using a decompression algorithm corresponding to the compression algorithm, thereby producing the original multicast information.

When an optimum compression rate needs to be selected from a plurality of pre-selected compression rates, the compression rate may be computed as described above based on the information rate I of multicast information and the transmission rate T, and an optimum compression rate may be chosen from the pre-selected compression rates by selecting one that is the smallest among those larger than the computed compression rate.

There is a case in which multicast information provided from the information source (server) to the wireless base station through the network includes coded still images or a series of coded still images. In such a case, information may be discarded once at predetermined intervals to reduce the size of information, thereby making it possible to transmit the multicast information at a lower transmission rate. In this case, the rate of information reduction is the same as the compression rate described above. If the reduction rate needs to be set equal to ⅘, for example, one in every five image frames is discarded during transmission to wireless terminals.

When multicast information obtained at the rate I from the network NW is transmitted to a plurality of wireless terminals at different transmission rates, without adjustment of information size, timing to read information from the multicast information storage unit 22 will be slower the slower the transmission rate becomes. Each transmission rate needs to be adjusted to make sure that such delay does not adversely affect other processing of the wireless base station BS.

Figure 16:
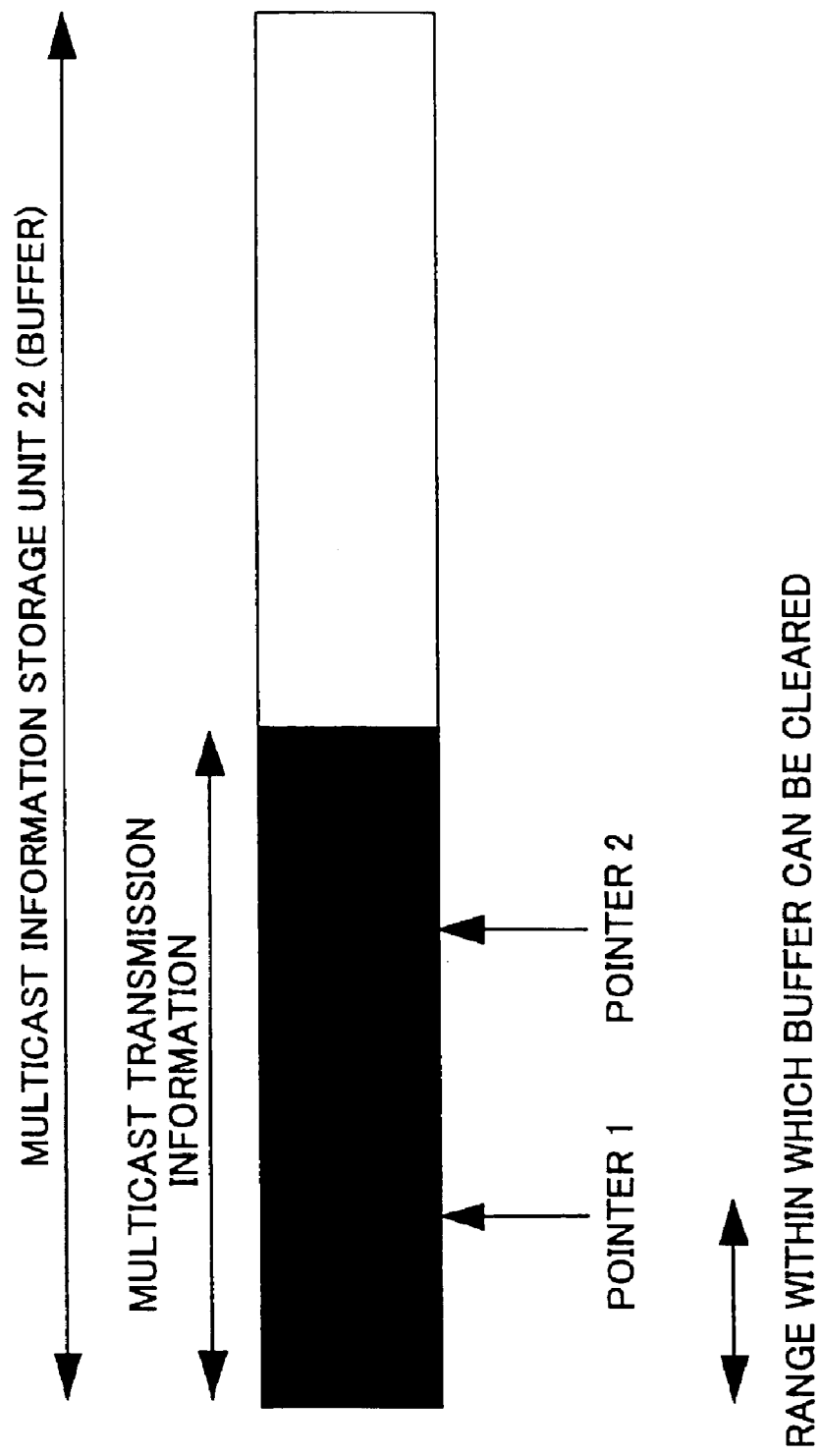
FIG. 16 is an illustrative drawing showing buffer pointers used when transmitting the same multicast information at different transmission rates.
Figure 17:
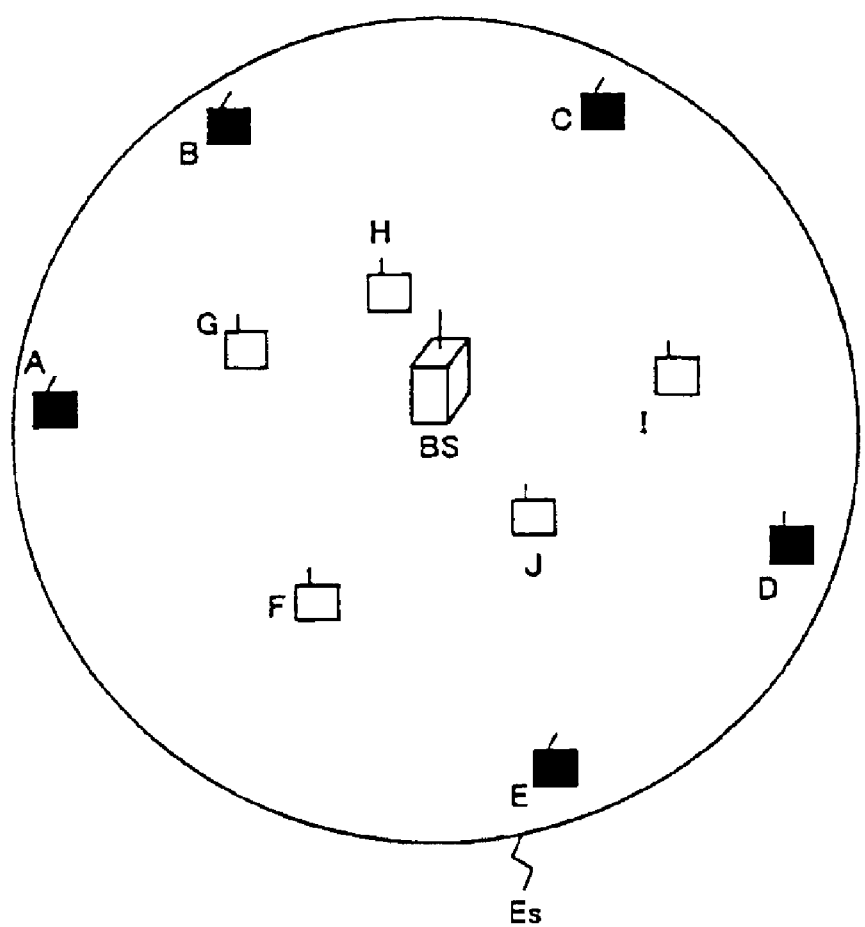
FIG. 17 is an illustrative drawing for explaining a case in which wireless terminals situated in different wireless communication environments experience different quality of reception when receiving multicast information.

As shown in FIG. 16, multicast information obtained from the network NW is temporarily stored in the multicast information storage unit (buffer) 22. Since this stored multicast information is to be transmitted at different transmission rates, a point at which the stored multicast information is read from the multicast information storage unit 22 differs depending on the transmission rates. For example, there may be a transmission rate T and a transmission rate T', which are used by the wireless base station BS to transmit multicast information. In such a case, the buffer is provided with pointers corresponding to the transmission rates. The transmission rate T is larger than the transmission rate T' (T>T'), and a pointer 1 is moved through the buffer to read multicast information that is transmitted at the transmission rate T through a given channel, with a pointer 2 being moved through the buffer to read multicast information that is transmitted at the transmission rate T through another channel.

Information stored in the buffer area already swept by the pointer 1 can be cleared. Assuming that the transmission rates T and T' represent average rates, an average delay time can be obtained based on an average D of the amount of information residing between the pointer 2 and the pointer 1. That is, the average delay time is obtained as:

Average Delay Time=$D/(T-T')$

The average delay time as computed above should not affect the performance of applications in the wireless base station BS. To insure this, the information delivery control unit 24 adjusts the transmission rates T and T'.

In the above example, each wireless terminal measures reception quality, and reports the measured results to the wireless base station BS. Based on the measured results of the reception quality reported from each wireless terminal, the wireless base station BS determines the transmission conditions of multicast information, and, then, notifies each wireless terminal of the transmission conditions such as the processing gain of spreading, the number of spreading codes, the identification of timeslots, the modulation scheme (modulation multi-number), the compression rate of information, etc. Then, the same multicast information is transmitted according to the transmission conditions as determined. Each wireless terminal receives the multicast information in accordance with the transmission conditions of the multicast information. This makes it possible for each wireless terminal to receive the multicast information having sufficiently high quality even if communication environments vary between the wireless terminals.

The above example has been described with reference to a case in which each wireless terminal measures the reception quality as an indication of communication environment, and notifies the wireless base station BS. Alternatively, such notification can be omitted. For example, the wireless base station BS transmits the same multicast information by using different sets of transmission conditions (i.e., different transmission rates, different timeslot positions, etc.), and notifies each wireless terminal of the multiple sets of transmission conditions by using a perch channel. Each wireless terminal selects one of the multiple sets of transmission conditions such that the selected set of conditions provide the highest service quality within the capacity of the measured reception quality. Each wireless terminal receives the multicast information in such a manner as to conform to the selected set of transmission conditions.

As described above, the system may be configured such that each wireless terminal does not need to inform the wireless base station BS of the measured results of the reception quality indicating the communication environments. In order to achieve such a configuration, each wireless terminal needs to be provided with the function of selecting an optimum transmission condition in response to the measured results.

Further, the present invention is not limited to these embodiments, but various variations and modifications may be made without departing from the scope of the present invention.

The present application is based on Japanese priority application No. 2000-140845 filed on May 12, 2000, with the Japanese Patent Office, the entire contents of which are hereby incorporated by reference.

What is claimed is:

1. A method of delivering multicast service from an information delivery apparatus to wireless terminals that are experiencing different reception conditions within a service area, comprising the steps of:

transmitting, from the information delivery apparatus, a plurality of identical sets of multicast information under respective different transmission conditions that correspond to the different reception conditions of the wireless terminals; and receiving, at any given one of the wireless terminals, one of the identical sets of multicast information being transmitted under the respective different transmission conditions, said one of the identical sets being transmitted under one of the different transmission conditions and being received by use of said one of the different transmission conditions that is selected based on the reception quality measured at said given one of the wireless terminals.

2. The method as claimed in claim 1, further comprising a step of notifying the information delivery apparatus of the reception quality measured at each of the wireless terminals, wherein said information delivery apparatus selects said one of the different transmission conditions based on the reception quality.

3. The method as claimed in claim 2, further comprising a step of having the information delivery apparatus notify the wireless terminals of the differing transmission conditions, wherein said step of receiving receives the one of the sets of multicast information by using the one of the differing transmission conditions that is notified by the information delivery apparatus.

4. The method as claimed in claim 1, wherein said one of the different transmission conditions is selected at said given one of the wireless terminals based on the reception quality.

5. The method as claimed in claim 1, further comprising a step of decreasing a size of the multicast information to be transmitted as the differing transmission rates decrease.

6. The method as claimed in claim 5, wherein said step of decreasing adjusts a compression rate of the multicast information to be transmitted so as to decrease the size of the multicast information.

7. The method as claimed in claim 1, further comprising the steps of:

storing the multicast information in a buffer at the information delivery apparatus as the multicast information is received from a network; and assigning channels to the respective sets of the multicast information as the respective sets are read from the buffer at rates of reading corresponding to the differing transmission rates.

8. The method as claimed in claim 7, further comprising a step of adjusting the differing transmission rates based on delays of the reading of the multicast information from the buffer.

9. An information delivery apparatus for delivering multicast information by radio to wireless terminals that are experiencing different reception conditions within a service area, comprising:

a multicast information storage unit which stores the multicast information to be transmitted; and an information delivery control unit which controls said multicast information storage unit so as to transmit a plurality of identical sets of the multicast information, under respective different transmission conditions that are determined based on reception qualities of the wireless terminals reported from the wireless terminals.

10. The apparatus as claimed in claim 9, wherein said information delivery control unit notifies the wireless terminals of the determined differing transmission conditions.

11. The apparatus as claimed in claim 9, wherein said information delivery control unit notifies the wireless terminals of the differing transmission conditions used to transmit the plurality of sets of multicast information.

12. The apparatus as claimed in claim 9 wherein said information delivery control unit decreases a size of the multicast information to be transmitted as the differing transmission rates decrease.

13. The apparatus as claimed in claim 12 wherein said information delivery control unit adjusts a compression rate of the multicast information to be transmitted so as to decrease the size of the multicast information.

14. The apparatus as claimed in claim 9, wherein said information delivery control unit assigns channels to the respective sets of the multicast information as the respective sets are read from said multicast information storage unit at rates of reading corresponding to the differing transmission rates.

15. The apparatus as claimed in claim 14, wherein said information delivery control unit adjusts the differing transmission rates based on delays of the reading of the multicast information from said multicast information storage unit.

16. A wireless terminal for receiving multicast information from an information delivery apparatus by radio, comprising:

a reception quality measuring unit which measures a reception quality of a signal received from the information delivery apparatus;

a reception quality notifying unit which transmits the measured reception quality to the information delivery apparatus; and an information reception control unit which receives one of identical sets of multicast information transmitted from the information delivery apparatus under respective different transmission conditions, said one of identical sets of multicast information being transmitted under one of the different transmission conditions and being received by use of said one of the different transmission conditions that is selected based on the reception quality measured by said reception quality measuring unit.

* * * * *